July 9, 1929.  H. J. MURRAY  1,720,230
MULTIPLEX BURGLAR ALARM
Filed Jan. 12, 1921
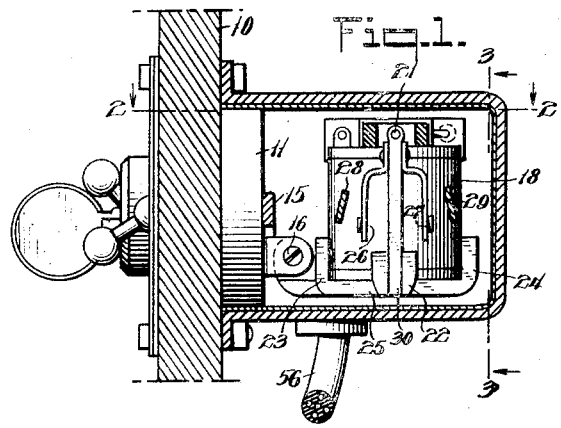

Patented July 9, 1929.

1,720,230

UNITED STATES PATENT OFFICE.

HOWARD J. MURRAY, OF NEW YORK, N. Y., ASSIGNOR TO R. M. COMPANY, INC., OF EAST PITTSBURGH, PENNSYLVANIA, A CORPORATION OF DELAWARE.

MULTIPLEX BURGLAR ALARM.

Application filed January 12, 1921. Serial No. 436,803.

The invention relates in general to a multiplex burglar alarm system of general application and particularly designed for installation upon an automotive vehicle to indicate the theft of an article from the vehicle or any other undesirable occurrence or condition. Considered in another aspect of the disclosure the invention relates to an alarm control in the form of an article of manufacture designed to be assembled with and controlled by any of the conventional types of ignition switches usually found on automotive vehicle structures.

One of the primary objects of the invention is to provide a simple form of device of the type outlined which, when set by the ignition switch or other manually actuated control, will automatically sound the horn or other notice compelling instrumentality and shut off the ignition whenever certain desirable conditions present change their status. The disclosure as hereinafter described contemplates the actuation of the alarm control to indicate temperature, pressure, or motion, or a change in either and specifically to blow the horn and to cut off the ignition and thus stall the engine when any of the following events occur:— a—The car is moved;
b—The hood covers are moved;
c—A spare tire is removed;
d—A predetermined speed is reached;
e—The fuel supply has reached the desired amount;
f—A door is opened;
g—A fire occurs;
h—A robe or garment is moved;
i—The battery is over-charged;
j—A foot is placed on the step or floor covering;
k—Pressure is added to or removed from any of the seats, and in fact any change in normal status of the different parts can be utilized as a means for closing the alarm circuit, and/or, stalling the engine or other mechanisms.

Still another object of the invention is to provide an arrangement of electrical connections which will permit the use of a device such as outlined and at the same time will not interfere with the operation of the vehicle upon which it is mounted as at present practiced. In other words, the ignition is opened or closed and the horn or other alarm sounded independently of the burglar alarm system herein featured.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a vertical sectional view through a preferred embodiment of the invention shown in position mounted on the dash-board or instrument board of a motor vehicle and operatively connected to a conventional form of ignition switch;

Figure 2 is a horizontal sectional view taken on the line 2—2 of Figure 1 and showing the alarm device in plan;

Figure 3 is a vertical sectional view taken on the line 3—3 of Figure 2 and with parts of the showing broken away;

Figure 4 is a front view of the showing in Figure 1 looking at the same from the left-hand side; and Figure 5 is a diagrammatic view showing one suggested form of wiring of the device shown in the preceding figures together with the leads to the parts associated therewith in the vehicle.

In the following description and in the claims, parts will be identified by specific names for convenience of expression but they are intended to be as generic in their application to similar parts as the art will permit.

In the drawings there is shown an instrument board 10, upon which is mounted a two gang switch 11 provided with the usual ignition switch 12 and the key controlled locking switch 13; it being understood that the switch 14 illustrated in Figure 4 is the usual head light control switch.

The alarm constitutes an article of manufacture, complete in itself, and is fastened to the rear wall of switch 11 by means of a bracket 15 which includes a horizontally disposed pivotal connection 16 arranged to adjust the position of the parts so that the pendulum hereinafter described may normally hang vertically or rather in spaced relation to its coacting parts. The pivotal connection 16 includes a jamb nut 17, for securing the parts together in their adjusted relation. The alarm includes an electromagnet 18 having an upper pole piece 19 which extends beyond the outline of the spool part of the electromagnet and provides a support for a pendulum 20, the upper end of which is pivotally fulcrumed between pivot pins 21 and the lower end of which is provided with a bob 22 constituting a movable armature oscillating between the spaced apart ends 23 and 24 of the lower fixed pole piece 25 of the electromagnet. The pendulum constitutes the movable element of a two point contact circuit closer and carries on opposite sides spring arms 26 and 27 for engagement respectively with the relatively fixed contacts 28 and 29 constituting part of a plate 30 depending from the extended portion of the upper pole piece and insulated therefrom by means of a strip of insulating material 31. In order to defeat any tendency of the pole ends 23 and 24 to neutralize their pull on the pendulum bob the pendulum is hung nearer one pole end than the other, or the reluctance of one of the pole ends is increased over the other.

On the side of the electromagnet opposite the pendulum is movably mounted a rocking armature 32 normally disposed in spaced relation to the adjacent end of the upper pole piece and held in circuit closing engagement with a relatively fixed contact 33 by means of spring 34. A coacting contact 35 is carried by the armature and coacts with the contact 33 to form a normally closed ignition circuit controlling circuit closer. When actuated by the electromagnet the armature is drawn towards the same to break contact in the ignition circuit by separating contacts 33 and 35 and into position to close contacts 36 and 37 constituting the contacts of a normally open alarm signal or horn circuit closer.

Referring to the electric wiring of the parts as shown in Figure 5 it will be seen that conductor 40 leads from contact 36 to the portion of the usual horn conductor 41 between the usual control button 42 and horn 43 the opposite side of which horn is grounded at G. Conductor 44 leads from contact 37 to the portion of the horn conductor between the horn supplying battery and the control button 42. It will be understood therefore that the horn can be sounded either by the manual control of the button 42 or by the closing of the alarm circuit by reason of the electromagnet acting on the armature 32 to bring the contacts 36 and 37 into engagement.

The contacts 35 and 33 are connected respectively to conductors 45 and 46, the former leading to the ignition coil (not shown) the latter of which is designed to be opened or closed by means of the switch 12, and is grounded at G as is usual in ignition systems in use at present in internal combustion engines.

A battery circuit includes a source of electric energy 47 grounded on one side at G and leading by means of a conductor 48 through the key controlled switch 13 to the coil 49 of the electromagnet. From the electromagnet, the circuit is branched with one branch leading by means of a conductor 50 to one side of a plurality of normally open circuit closers 51, the opposite sides of each of which are grounded at G. These circuit closers are designated "load", "hood", "tire", "robes", "door", "floor" and hereinafter collectively referred to as the "tire" circuit closers. The circuit closers are of any standard spring contact type and are identified as normally biased to closed position but it is to be understood that in practice the circuit closers are all intended to be held in open position by the presence of some object such as a tire positioned between their contact points or by the presence of some object such as a door latch, the removal or movement of which will permit the circuit closers to move into their normal or closed position. It will be seen that these circuit closers are operable independently of the pendulum controlled circuit closer hereinafter described and thus are operable irrespective of whether the vehicle is moving or standing still. The removal of a tire for instance while the car is still will complete the circuit through the electromagnet, which in turn will close the alarm circuit. A shunt circuit leads from the magnetic circuit through a normally open pendulum controlled circuit closer formed by the relatively fixed contacts 28 and 29 and the movable contacts 26 and 27 carried by the pendulum. The engagement of the bob 22 with the lower armature 23, which is grounded as indicated by the conductor 52 in Figure 5, completes the shunt circuit when closed by the swinging pendulum and the electromagnet acts on the bob to hold the shunt circuit closed and the electromagnet energized independently of the succeeding positions of the circuit closers 51. By this construction the pendulum itself becomes part of the magnetic circuit and thereby acts to decrease the reluctance of the circuit. In this way a coil requiring less current can be used and hence to do the same work it may be made smaller and lighter than otherwise, or if it is left the same size the effective pull is greater.

It may also be desired to cause the alarm to sound while the vehicle is running and therefore with the switch 13 in open position to indicate some undesirable situation present. For this purpose there is shown a plurality of circuit closers 54 to one side of which leads a conductor 54' from the ungrounded side of the battery 47 and from the other side of which a conductor 55 leads to the electromagnet coils 49. The circuit closers 54 are designated in the drawings "fire", "temperature", "speed", and "overcharge" and are collectively designated hereinafter as "fire" controlled circuit closers.

In operation and assuming the condition in which the driver has left the car standing still with the switch 12 closed so as to permit the motor to be turning over and in which the switch 13 is closed so as to set the alarm, the parts are then in the position as shown in Figure 5. Should any of the contacts 51 be closed, as by the removal of the tire from btween the contact points, the circuit will be completed from the ungrounded side of the battery 47 through conductor 48, switch 13, electromagnetic coil 49, the closed contact 51 and through the ground to the opposite side of the battery 47. This will have the effect of energizing the electromagnet 18 and two results will follow: First, the armature 32 will be drawn from the open circuit position shown in Figure 5 into position to close contacts 36 and 37, thus connecting the alarm battery through the conductors 44, 40, 41 to sound the horn or other notice compelling member 43. At the same time the armature bob 22 will be attracted to the lower armature 23 of the energized electro-magnet, closing the shunt circuit through the conductor 52, thus completing the circuit which includes the electromagnet coil and battery 47. This closed circuit maintains the electromagnet in energized condition, thus locking the contacts 36 and 37 in interengagement and maintaining the actuation of the alarm device independently of the succeeding condition of the closed contact 51. In other words, after the device has been once started in its notice compelling actuation the succeeding openings of the closed contact 51, as by restoring the tire between its contact points, will not act to stop the alarm from sounding. This alarming condition will persist until the party possessing the controlling key for the switch 13 breaks contact at 13 and thus permits the spring 34 to restore the armature 32 into its normal position closing the ignition circuit and opening the alarm circuit.

It is understood, of course, that the switch 12 may be opened or closed as usual without affecting the alarm device but when the alarm is sounded the circuit is broken between the contacts 33 and 35 so that the engine is stalled automatically with the sounding of the alarm. This construction permits the operator to leave the alarm set with the engine running whenever necessary as to prevent freezing.

It is also appreciated, that any movement of the vehicle will act upon the inertially controlled pendulum 20 to swing the same on its pivotal point 21 in one or the other direction to close the circuit through the fixed contacts 28 or 29 depending upon the direction of swing and when the pendulum has so acted to close the circuit through the electromagnet the same action will occur as has been described for the closing of the circuit by one of the circuit closers 51.

Should any of the conditions arise which will act to close any of the circuit closers 54, as for instance, the occurrence of a fire acting to melt a fusable contact when switch 13 is opened, the closing of any of the contacts 54 will complete the circuit from the ungrounded side of the battery 47 through the closed contact 54, conductor 55, electromagnet coil 49 through the grounded electromagnet due to the contacting of pendulum 22 with one of the contacts 28 or 29 thence to the ground through the wire 52.

While I have shown and described and have pointed out in the annexed claim, certain novel features of my invention, it will be understood that various omissions, substitutions and changes in the form and details of the device illustrated and in its operation may be made by those skilled in the art without departing from the spirit of the invention.

Having thus described my invention, I claim:

In a vehicle alarm device of the class described, a source of electrical energy, an electromagnet, a first normally open circuit closer, a switch, and means including the first circuit closer to establish a first circuit including said source, electromagnet, circuit closer and switch whereby said electromagnet is energized upon closing of said first circuit closer when said switch is closed; a fixed contact, a movable armature for said electromagnet and a contact carried thereby, said armature being free so as to act by its own inertia when said vehicle moves whereby to conductively engage said contacts, a second normally open circuit closer conncted in shunt of said switch, and means including the second circuit closer to establish a second circuit including said source, electromagnet, contacts and second circuit closer whereby said electromagnet is energized upon closing of said second circuit closer when said switch is open and the vehicle is moving, said armature being attracted upon energization of said electromagnet whereby to close and maintain closed said second circuit; an alarm device, and means actuated by said electromagnet upon energization to operate said alarm device.

Signed at New York city, in the county of New York and State of New York this 10th day of January, A. D. 1921.

HOWARD J. MURRAY.